(12) United States Patent
Rolland et al.

(10) Patent No.: US 8,811,558 B2
(45) Date of Patent: Aug. 19, 2014

(54) METHOD OF SYNCHRONIZING TWO ELECTRONIC DEVICES OF A WIRELESS LINK, IN PARTICULAR OF A MOBILE TELEPHONE NETWORK AND SYSTEM FOR IMPLEMENTING THIS METHOD

(71) Applicants: Alain Rolland, Quincy sous Senart (FR); Stéphane Blanc, Breuillet (FR); Jean-Christophe Plumecoq, Palaiseau (FR)

(72) Inventors: Alain Rolland, Quincy sous Senart (FR); Stéphane Blanc, Breuillet (FR); Jean-Christophe Plumecoq, Palaiseau (FR)

(73) Assignee: E-Blink, Boussy Saint Antoine (FR)

( * ) Notice: Subject to any disclaimer, the term of this patent is extended or adjusted under 35 U.S.C. 154(b) by 0 days.

(21) Appl. No.: 13/874,296

(22) Filed: Apr. 30, 2013

(65) Prior Publication Data

US 2013/0243142 A1   Sep. 19, 2013

Related U.S. Application Data

(63) Continuation of application No. 12/306,306, filed as application No. PCT/FR2007/051602 on Jul. 5, 2007, now Pat. No. 8,467,488.

(30) Foreign Application Priority Data

Jul. 7, 2006   (EP) .................................... 06291127

(51) Int. Cl.
*H04L 7/04* (2006.01)
(52) U.S. Cl.
USPC ......................................... 375/362; 375/354

(58) Field of Classification Search
USPC .................................................. 375/362, 354
See application file for complete search history.

(56) References Cited

U.S. PATENT DOCUMENTS

| 4,806,878 | A | * | 2/1989 | Cowley ......................... 331/1 A |
| 4,827,395 | A | | 5/1989 | Anders et al. |
| 5,513,176 | A | | 4/1996 | Dean et al. |
| 5,533,011 | A | | 7/1996 | Dean et al. |
| 5,602,834 | A | | 2/1997 | Dean et al. |
| 5,652,765 | A | | 7/1997 | Adachi et al. |
| 5,768,268 | A | | 6/1998 | Kline et al. |
| 5,842,002 | A | | 11/1998 | Schnurer et al. |

(Continued)

FOREIGN PATENT DOCUMENTS

| DE | 3108901 | 9/1982 | |
| EP | 1 501 215 A1 * | 1/2005 | ............... H04B 7/15 |

(Continued)

OTHER PUBLICATIONS

Non-Final Office Action, Jun. 3, 2013, U.S. Appl. No. 13/732,273, filed Dec. 31, 2012.

(Continued)

*Primary Examiner* — Shuwang Liu
*Assistant Examiner* — Nader Bolourchi
(74) *Attorney, Agent, or Firm* — Carr & Ferrell LLP

(57) ABSTRACT

A method of synchronizing two electronic devices connected by a wireless link with at least one path including a transmission channel and a reception channel. The two devices are included in a network, such as a mobile telephone network. Synchronization information is transmitted directly from one electronic device to the other, as a clock pilot signal, via the channels. After recovery, the clock pilot signal is used for synchronization of a reference frequency of the receiving electronic device.

10 Claims, 3 Drawing Sheets

(56) References Cited

U.S. PATENT DOCUMENTS

| | | |
|---|---|---|
| 5,940,598 A | 8/1999 | Strauss et al. |
| 5,969,678 A | 10/1999 | Stewart |
| 6,049,315 A | 4/2000 | Meyer |
| 6,072,994 A | 6/2000 | Phillips et al. |
| 6,094,677 A | 7/2000 | Capek et al. |
| 6,339,611 B1 | 1/2002 | Antonio et al. |
| 6,349,214 B1 * | 2/2002 | Braun .................. 455/502 |
| 6,385,435 B1 | 5/2002 | Lee |
| 6,389,059 B1 | 5/2002 | Smith et al. |
| 6,603,956 B1 | 8/2003 | Shin |
| 6,640,110 B1 | 10/2003 | Shapira et al. |
| 6,904,266 B1 | 6/2005 | Jin et al. |
| 7,010,325 B1 | 3/2006 | Oh |
| 7,123,911 B1 | 10/2006 | Ngan |
| 7,463,673 B2 | 12/2008 | Fujii et al. |
| 7,535,972 B2 | 5/2009 | Hammerschmidt et al. |
| 7,680,203 B2 | 3/2010 | Kuroda |
| 7,738,579 B2 | 6/2010 | Sadowsky et al. |
| 7,801,230 B2 | 9/2010 | Sung et al. |
| 8,064,821 B2 | 11/2011 | Roland et al. |
| 8,275,310 B2 | 9/2012 | Rolland et al. |
| 8,467,488 B2 | 6/2013 | Rolland et al. |
| 2001/0011009 A1 | 8/2001 | Harada et al. |
| 2001/0031624 A1 | 10/2001 | Schmutz |
| 2002/0028655 A1 | 3/2002 | Rosener et al. |
| 2002/0072375 A1 | 6/2002 | huslig |
| 2002/0147978 A1 | 10/2002 | Dolgonos et al. |
| 2003/0027597 A1 | 2/2003 | LaGrotta et al. |
| 2003/0140256 A1 | 7/2003 | Hauenstein et al. |
| 2003/0232595 A1 | 12/2003 | Baker et al. |
| 2004/0015712 A1 | 1/2004 | Szor |
| 2004/0048596 A1 | 3/2004 | Wyrzykowska et al. |
| 2004/0052226 A1 | 3/2004 | Frank et al. |
| 2004/0077345 A1 | 4/2004 | Turner et al. |
| 2004/0145849 A1 | 7/2004 | Chang et al. |
| 2004/0166802 A1 | 8/2004 | McKay, Sr. et al. |
| 2005/0085267 A1 | 4/2005 | Lemson et al. |
| 2005/0130587 A1 | 6/2005 | Suda et al. |
| 2005/0176368 A1 | 8/2005 | Young et al. |
| 2005/0256963 A1 | 11/2005 | Proctor, Jr. et al. |
| 2006/0068848 A1 | 3/2006 | Shapira et al. |
| 2006/0140161 A1 | 6/2006 | Stephens et al. |
| 2006/0205343 A1 | 9/2006 | Runyon et al. |
| 2007/0091896 A1 | 4/2007 | Liu |
| 2007/0147278 A1 | 6/2007 | Millar |
| 2007/0243824 A1 | 10/2007 | Roland et al. |
| 2008/0181171 A1 | 7/2008 | Koziy et al. |
| 2009/0003831 A1 | 1/2009 | Zheng |
| 2009/0252267 A1 | 10/2009 | Rolland et al. |
| 2009/0325479 A1 | 12/2009 | Chakrabarti et al. |
| 2012/0100847 A1 | 4/2012 | Rahman |
| 2012/0140654 A1 | 6/2012 | Pak et al. |
| 2013/0294253 A1 | 11/2013 | Leroudier |
| 2013/0294541 A1 | 11/2013 | Blanc et al. |

FOREIGN PATENT DOCUMENTS

| | | |
|---|---|---|
| EP | 1534027 | 5/2005 |
| EP | 1648099 | 4/2006 |
| EP | 2099183 | 9/2009 |
| JP | 59154827 | 9/1984 |
| WO | 2004/027635 | 4/2004 |
| WO | 2004/045125 | 5/2004 |
| WO | 2013164445 | 11/2013 |

OTHER PUBLICATIONS

Notice of Allowance, Jan. 17, 2014, U.S. Appl. No. 13/732,273, filed Dec. 31, 2012.

Non Final Office Action, May 3, 2013, U.S. Appl. No. 13/735,903, filed Jan. 7, 2013.

Final Office Action, Aug. 20, 2013, U.S. Appl. No. 13/735,903, filed Jan. 7, 2013.

Non Final Office Action, Feb. 20, 2014, U.S. Appl. No. 13/735,903, filed Jan. 7, 2013.

Non-Final Office Action, Feb. 16, 2011, U.S. Appl. No. 12/306,306, filed Jul. 5, 2007.

Final Office Action, Nov. 2, 2011, U.S. Appl. No. 12/306,306, filed Jul. 5, 2007.

Non-Final Office Action, Jun. 29, 2012, U.S. Appl. No. 12/306,306, filed Jul. 5, 2007.

Notice of Allowance, Jan. 30, 2013, U.S. Appl. No. 12/306,306, filed Jul. 5, 2007.

Non-Final Office Action, Nov. 6, 2009, U.S. Appl. No. 10/579,474, filed Mar. 7, 2007.

Final Office Action, May 17, 2010, U.S. Appl. No. 10/579,474, filed Mar. 7, 2007.

Non-Final Office Action, Oct. 27, 2010, U.S. Appl. No. 10/579,474, filed Mar. 7, 2007.

Notice of Allowance, Jul. 20, 2011, U.S. Appl. No. 10/579,474, filed Mar. 7, 2007.

Non-Final Office Action, Aug. 4, 2011, U.S. Appl. No. 12/439,837, filed Oct. 6, 2009.

Notice of Allowance, Jun. 5, 2012, U.S. Appl. No. 12/439,837, filed Oct. 6, 2009.

International Search Report dated Aug. 9, 2013 6186PCT Application No. PCT/EP2013/059236.

International Search Report dated Jul. 12, 2013 6185PCT Application No. PCT/US2013/039338.

* cited by examiner

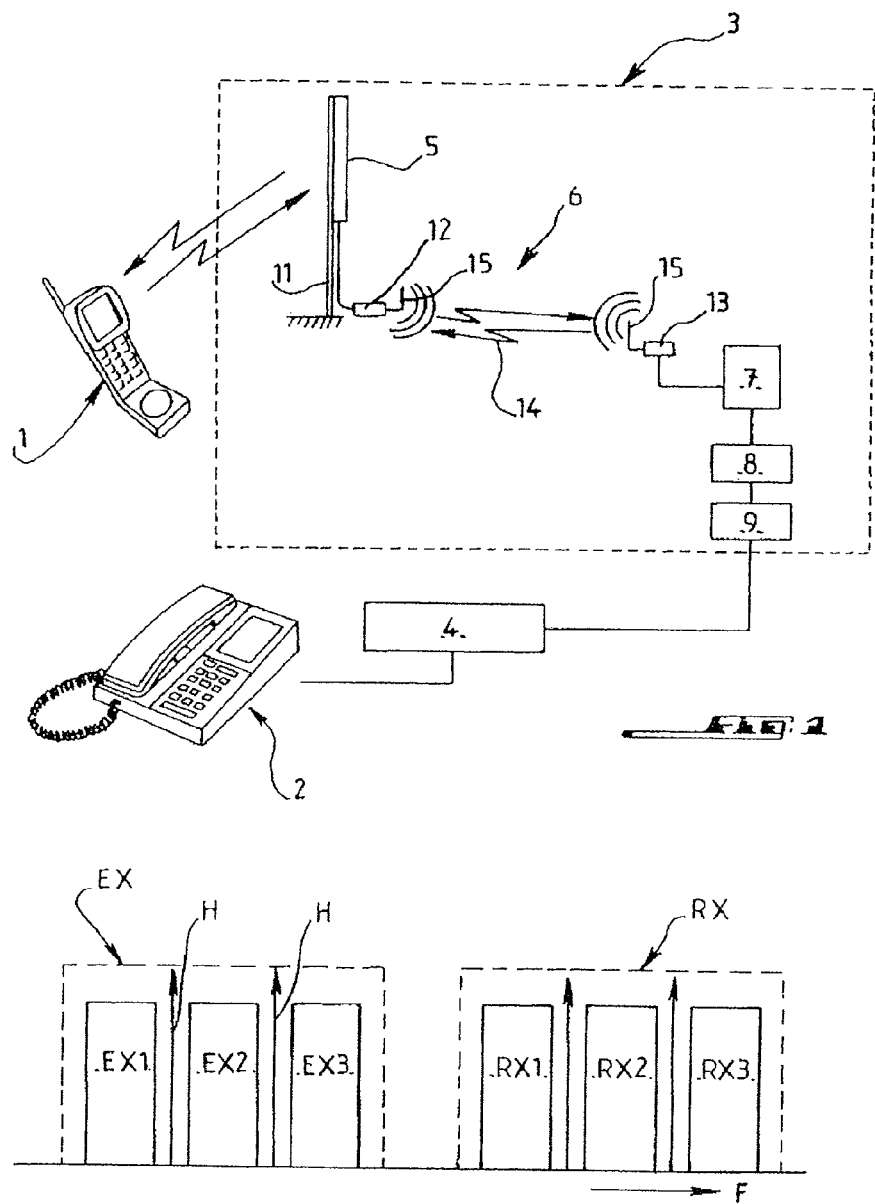

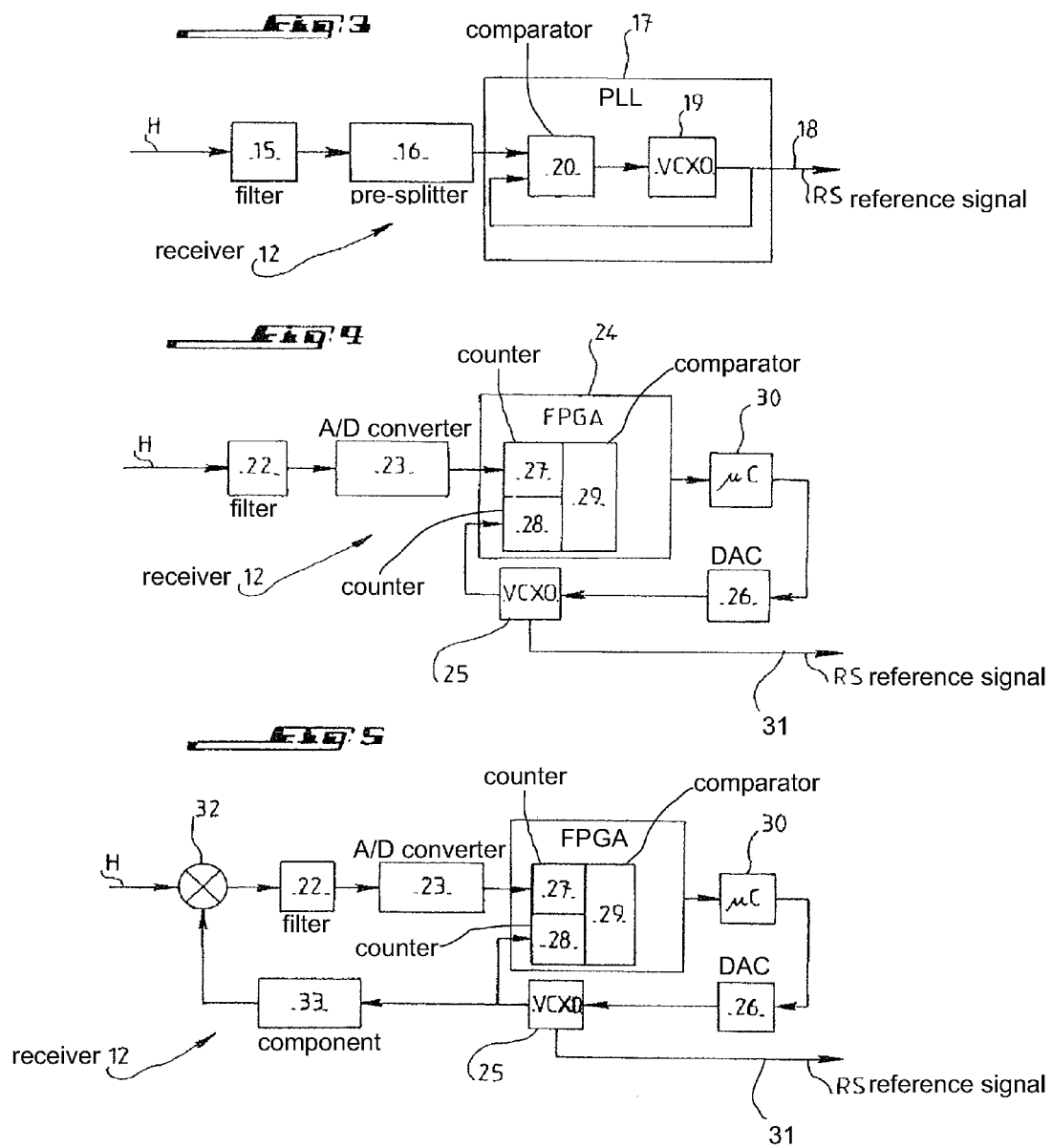

METHOD OF SYNCHRONIZING TWO ELECTRONIC DEVICES OF A WIRELESS LINK, IN PARTICULAR OF A MOBILE TELEPHONE NETWORK AND SYSTEM FOR IMPLEMENTING THIS METHOD

CROSS REFERENCE TO RELATED APPLICATIONS

This application is a continuation of U.S. patent application Ser. No. 12/306,306, filed Apr. 20, 2009, entitled "METHOD OF SYNCHRONIZING TWO ELECTRONIC DEVICES OF A WIRELESS LINK, IN PARTICULAR OF A MOBILE TELEPHONE NETWORK AND SYSTEM FOR IMPLEMENTING THIS METHOD" which entered the U.S. national stage under 35 U.S.C. §371 of the Patent Cooperation Treaty (PCT) from international patent application no. PCT/FR2007/051602, filed on Jul. 5, 2007, entitled, "METHOD OF SYNCHRONIZING TWO ELECTRONIC DEVICES OF A WIRELESS LINK, IN PARTICULAR OF A MOBILE TELEPHONE NETWORK AND SYSTEM FOR IMPLEMENTING THIS METHOD" which claims the priority benefit of European Application No. 06291127.6, filed on Jul. 7, 2006. The disclosures of all the aforementioned applications are incorporated herein by reference.

FIELD OF THE INVENTION

The invention concerns a method of synchronizing two electronic devices of a wireless electrical signal transmission link, in particular of a mobile telephone network, according to which the synchronization information is transmitted from one device to the other. The invention also concerns a system for implementing this method.

BACKGROUND

The standards in force for mobile telephone networks only tolerate a frequency error smaller than several millionths of the signal frequency. This demand requires perfect synchronization of the two devices. It is known to perform the synchronization directly on the frame and recover the clock upon reception. But the frequency stability thus obtained is insufficient.

The invention aims to resolve this drawback.

SUMMARY OF THE INVENTION

To achieve this aim, the method according to the invention is characterized in that one transmits the clock directly from one device to the other and uses this clock, after recovery, for synchronization of the reception device.

According to one characteristic of the invention, the method is characterized in that one transmits the clock signal in digital form.

According to another characteristic of the invention, the method is characterized in that one establishes, in the transmitter device, the digital value of the pilot signal, modulates the digital value on this pilot signal and transmits the latter modulated by its digital value to the reception device.

According to still another characteristic of the invention, the method is characterized in that one modulates, on the pilot signal, a frame comprising other information in addition to the digital value of the pilot signal.

The system for the implementation of the method according to the invention is characterized in that the reception device essentially comprises a local oscillator component generating the reference frequency, which is controlled by comparator means for the clock signal received at said reference signal.

According to one characteristic of the invention, the system is characterized in that the reception device comprises an analog digital converter and in that the control component of the local oscillator comprises counters for the digital clock signal and the reference signal and comparator means for the two counters, the local oscillator being controlled by a signal established from the result of the comparator.

According to another characteristic of the invention, the system is characterized in that, in the case of a high pilot frequency signal, the reception device comprises a mixer, the oscillator of which is controlled from the oscillator generating the reference signal.

According to still another characteristic of the invention, the system is characterized in that the transmitting device comprises means modulating the clock pilot signal by the digital value of the clock signal and in that the reception device comprises demodulator means.

According to still another characteristic of the invention, the system is characterized in that the means for modulating the pilot signal are adapted to modulate, on the latter, a frame comprising other information in addition to the digital value of the clock signal.

BRIEF DESCRIPTION OF DRAWING FIGURES

The invention will be better understood, and other aims, characteristics, details and advantages thereof will appear more clearly in the explanatory description which follows, done in reference to the appended diagrammatic drawings provide solely as an example illustrating one embodiment of the invention and in which:

FIG. 1 is a diagrammatic view illustrating the structure of a wireless communication system to which the invention is applicable;

FIG. 2 is a diagrammatic view illustrating the arrangement of a clock frequency in the frequency spectrum of a bidirectional link of a wireless communication system according to FIG. 1, according to the invention;

FIG. 3 is a diagrammatic view of a first embodiment of a clock synchronization device according to the invention;

FIG. 4 is a diagrammatic view illustrating a second embodiment of a clock synchronization device according to the invention;

FIG. 5 is a diagrammatic view illustrating a third embodiment of a clock synchronization device according to the invention;

DETAILED DESCRIPTION

Figure 6:
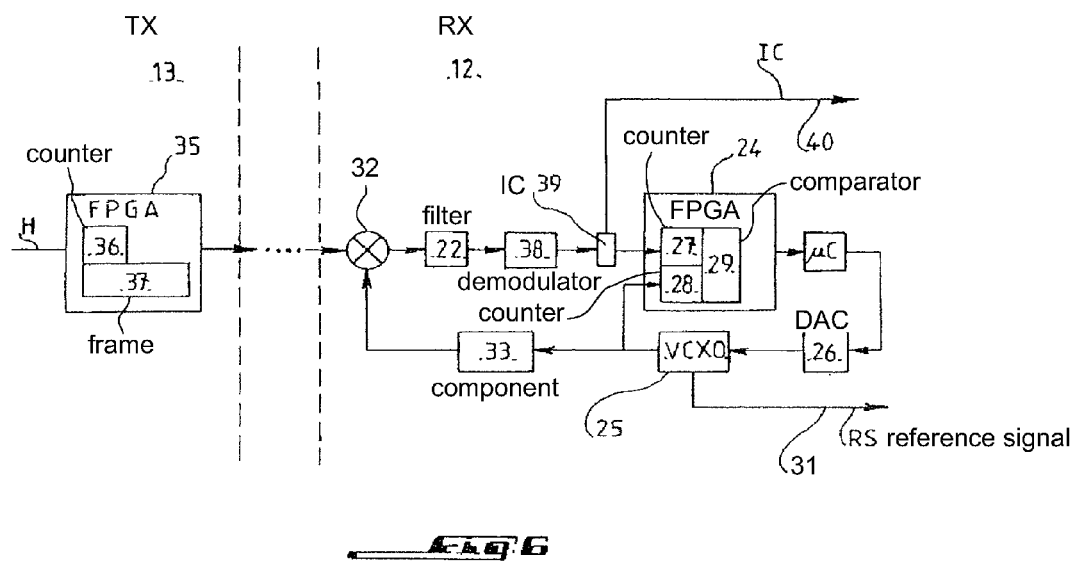
FIG. 6 is a diagrammatic view illustrating a fourth embodiment of a clock synchronization device according to the invention.

The method according to the invention, in its different embodiments and devices implementing these methods, can advantageously be used in the framework of a wireless transmission system as illustrated, as an example, in FIG. 1. This figure illustrates a communication system between a mobile telephone 1 and a fixed telephone 2 via a mobile telephone network 3 (hereinafter network 3) and a fixed network 4. Inside the mobile telephone network 3, the communication passes through a relay antenna 5 (hereinafter antenna 5) intended to communication with the mobile telephone 1, a data transmission link 6 (hereinafter link 6) and a radio communication bay 7 generally called BTS (Base Transceiver System) of a fixed base station which, also comprises a base control station 8 commonly called BSC (Base Station Control) and a communication center 9 called MSC (Mobile Switching Center). The wireless link between the antenna 5 and the BTS bay 7 comprises an electronic device in the form of an electronic box 12 (hereinafter box 12) connected to the relay antenna 5 and an electronic device in the form of an electronic box 13 (hereinafter box 13) connected to the BTS bay 7. The transmission of signals between these two boxes is done by radiofrequency signals, i.e., wireless, as illustrated by reference 14. A system of this type is described in document WO 2005/05107.

The invention concerns the synchronization of the two boxes 12, 13 in order to ensure high frequency stability of the signals exchanged.

As shown by FIG. 2, a bidirectional link of the type of the link 6 comprises at least one path including a transmission channel EX and a reception channel RX and, in general, a plurality of bidirectional paths with two channels EX, RX. As seen in the figure, the EX channels of these paths on one hand, and the RX channels on the other hand, are grouped together. Thus the figure shows a group of three channels EX1, EX2, EX3 and a group of three reception channels RX1, RX2 and RX3.

According to the invention, the synchronization of the electronic boxes 12 and 13 of the network 3 is done by the direction transmission of the clock information H from one box to the other, for example from the box 13 to the box 12, and the recovery of the clock upon reception in order to synchronize the reception box on the transmitter box. This direct transmission from the clock is done by arrangement of the clock H between the two channels EX and RX of a single-path link and, in the case of a link with several paths shown in FIG. 2, between two adjacent transmission channels.

FIGS. 3 to 6 illustrate several possibilities or embodiments of the method according to the invention, each consisting of directly sending the clock H from the transmitter box to the receiver box and recovering it in the receiver box in the band RX.

According to a first embodiment of the invention, illustrated in FIG. 3, the clock pilot signal H is transmitted for example by the box 13, placed in the transmission band EX, in the manner illustrated in FIG. 2, and received in the electronic box 12 which comprises to this end, at the input, a filter 15, and successively, if applicable, a pre-splitter 16 designed to perform splitting of the frequency if the latter is too high and a phase locked loop 17 at the output terminal 18 of which the reference signal RS is available synchronized by the clock H and which has great spectral purity. To this end, the locked loop 17 comprises a voltage-controlled crystal oscillator, known under the name VCXO, which is controlled by a by a phase locked loop component 20 comprising two inputs connected to the pre-splitter 16 and the output of the oscillator 19, i.e., the output terminal 18 of the reference RS, respectively.

The device according to FIG. 3 provides for a pre-splitter because the reference frequency at the output terminal 18 must not exceed several hundred MHz.

A third embodiment mixing the digital and analog technologies is based on the sending of a pilot signal H and the counting of the frequency. The device for implementing this method comprises, as shown in FIG. 4, a filter 22 of the pilot signal coming from the electronic box 13 and position in the transmission band, in the manner described above, a converter 23 which performs the conversion of the pilot signal from analog to digital, a programmable logic component 24, called FPGA, which is part of a loop also comprising a local oscillator component 25 of the VCXO type, i.e., voltage-controlled with a crystal, which is controlled by a control component 26 of the type known by the name DAC. The component receives orders from a microprocessor 30, the input of which is connected to the output of the FPGA component 24. The microprocessor could also be integrated into the FPGA. As seen in the figure, this FPGA component comprises a first counter 27 designed to count the digital signals coming from the converter 23, a second counter 28 designed to count the signals coming from the VCXO oscillator 25 as well as a circuit 29 for comparing the results of the two counters 27 and 28, of the frequency locked loop type whereof the output signal is applied to the microprocessor 30 which gives orders to the VCXO oscillator 25, via the control component 26, the synchronized reference signal RS being available at the output 31 of the VCXO oscillator 25.

This embodiment presents the advantage of separating the frequency domains of the pilot and the reference. In the event the operating speed of the FPGA component 24 only allows operation at frequencies below the GHz, one will pass through an intermediate frequency to increase the working frequency.

FIG. 5 illustrates the device for recovering the synchronized reference RS in the case of a high pilot frequency, i.e., greater than the typical operating frequency of an FPGA component. To this end, the device comprises, in addition to the device according to FIG. 4, upstream from the filter 22, a mixer 32 for lowering the frequency of the pilot signal H and, assembled between this mixer 32 and the local VCXO oscillator 25, a component 33 which comprises a second oscillator of the VCO type and a phase-locked loop.

The mixer 32 allows, on one hand, easier filtering of signals from the pilot and, on the other hand, working at a frequency compatible with the FPGA component. This method makes it possible to obtain a reference with very high spectral purity and very good stability.

Another embodiment, illustrated in FIG. 6, proposes an architecture which makes it possible both to synchronize the two electronic boxes with a reference of very high spectral purity, while also transmitting different information. This method is purely digital.

FIG. 6 illustrates this method. One will note that the architecture of the device of the reception box corresponds to that of the embodiment according to FIG. 5. However, in the electronic box 13, the pilot H is applied to the FPGA component noted 35 and counted by the counter 36 and this value of the counter is modulated on the pilot and therefore digitally transmitted to the electronic box 12 in the form of amplitude modulation of the pilot.

Upon reception, the pilot is transposed by the mixer 32 at a lower frequency level which is not, however, obligatory in the case of a very rapid calculator. Then the modulating signal is recovered in the demodulator 38 and the counter value of the synchronization reference, i.e., of the pilot, is compared in the FPGA component to the counter 28 of the reference produced by the VCXO oscillator 25. From this comparison, a control signal is established and applied to this VCXO component in order to correct the frequency of the local oscillator thereof.

This embodiment of the invention makes it possible to transmit, in addition to the counter information from the synchronization pilot reference, other information by including, in the FPGA component of the electronic box 13 in a frame indicated in 37, in addition to the number of bits reserved for this counting result, a predetermined number of bits of other information. This communication information, noted IC, is separated in 39 from the digital value of the pilot H and available at the terminal 40. In this way, it is possible to transmit, in the communication frame, information such as alarms, control data, communication protocols between the base station and the antenna equipment or any other protocol.

This embodiment of the method makes it possible to completely free oneself from the stability of the pilot as well as from part of the communication parasites, insofar as the frequency of the pilot does not participate in the synchronization. Only the value of the counter resulting from the communication frames participates. The transmission of data from the frame in no case disturbs the operation of the system. It should be noted that even the loss of the synchronization signal for several frames does not cause any deterioration of stability. The solution being of a digital nature, encoding is easily possible to fight interference or pirating of the data.

The invention claimed is:

1. A method of synchronizing first and second electronic devices connected by a wireless transmission link for transmission of electrical signals over a path including a transmission channel and a reception channel, the first and second electronic devices being included in a network comprising a relay antenna and a radio communication bay, to each of which one of the first and second electronic devices is connected, the method comprising:
   transmitting synchronization information directly from the first electronic device to the second electronic device as a clock pilot signal via the transmission and reception channels over paths of the wireless transmission link;
   modulating a digital value onto the clock pilot signal, the digital value being a value of a counter designated to count frequency of sending a pilot signal and wherein the value is used to modulate the pilot signal to generate the clock pilot signal, wherein the synchronization information contains a frame comprising information in addition to the digital value of the clock pilot signal, wherein the information within the flame is selected from any of alarm data, control data, and one or more communication protocols; and
   using the clock pilot signal, after recovery, for synchronization of a reference signal of the second electronic device.

2. The method according to claim 1, including transmitting the clock pilot signal in digital form.

3. The method according to claim 2, including establishing, in the first electronic device, a digital value of the clock pilot signal, modulating the digital value on the clock pilot signal, and transmitting the clock pilot signal, modulated by the digital value, to the second electronic device.

4. The method according to claim 3, including modulating, on the clock pilot signal, the frame comprising information in addition to the digital value of the clock pilot signal.

5. The method according to claim 1, wherein
   the wireless transmission link comprises the path including the transmission channel and the reception channel, and
   the direct transmission of the clock pilot signal from the first electronic device to the second electronic device occurs over both of the transmission and reception channels.

6. The method according to claim 1, wherein the wireless transmission link comprises a plurality of paths, each path including a transmission channel and a reception channel, and the direct transmission of the clock pilot signal from the first electronic device to the second electronic device occurs over a plurality of adjacent transmission channels.

7. A system for synchronizing first and second electronic devices connected by a wireless link for transmission of electrical signals over a path including a transmission channel and a reception channel, the first and second electronic devices being included in a network comprising a relay antenna and a radio communication bay, to each of which one of the first and second electronic devices is connected, the system comprising:
   the first electronic device to transmit synchronization information directly to the second electronic device as a clock pilot signal via the transmission and reception channels over paths of the wireless link, comprising:
   a modulator circuit to modulate a digital value onto the clock pilot signal, the digital value being a value of a counter designated to count frequency of sending a pilot signal and wherein the value is used to modulate the pilot signal to generate the clock pilot signal, wherein the synchronization information contains a frame comprising information in addition to the digital value of the clock pilot signal, wherein the information within the frame is selected from any of alarm data, control data, and one or more communication protocols; and
   use the clock pilot signal, after recovery, for synchronization of a reference signal of the second electronic device, wherein the second electronic device comprises a local oscillator component generating the reference signal, which is controlled by a first comparator means in response to the clock pilot signal received for synchronization of the reference signal.

8. The system according to claim 7, wherein the second electronic device comprises an analog-digital converter, a control component of the local oscillator component that comprises a second counter that counts the clock pilot signal and a third counter that counts the reference signal and a second comparator means for comparing counts of the second and third counters, and the local oscillator component is controlled by a signal established by the second comparator means.

9. The system according to claim 8, wherein, in the case of a high pilot frequency signal, the second electronic device comprises a mixer having an oscillator controlled by the local oscillator component generating the reference signal.

10. The system according to claim 9, wherein means for modulating the clock pilot signal with the digital value of the clock pilot signal and the second electronic device comprises demodulator means.

* * * * *

UNITED STATES PATENT AND TRADEMARK OFFICE
CERTIFICATE OF CORRECTION

PATENT NO. : 8,811,558 B2  Page 1 of 1
APPLICATION NO. : 13/874296
DATED : August 19, 2014
INVENTOR(S) : Alain Rolland et al.

It is certified that error appears in the above-identified patent and that said Letters Patent is hereby corrected as shown below:

In the specification

In column 3, line 12, delete the text "2005/05107" and insert the text --2005/051017--.

Signed and Sealed this
Twenty-second Day of December, 2015

Michelle K. Lee
*Director of the United States Patent and Trademark Office*